(12) United States Patent
Sargent

(10) Patent No.: US 6,186,729 B1
(45) Date of Patent: Feb. 13, 2001

(54) PORTABLE RACK

(76) Inventor: David R. Sargent, 1124 W. Pine St., Mt. Morris, MI (US) 48458

( * ) Notice: Under 35 U.S.C. 154(b), the term of this patent shall be extended for 0 days.

(21) Appl. No.: 08/818,443

(22) Filed: Mar. 17, 1997

(51) Int. Cl.[7] .................................................. B60P 9/00
(52) U.S. Cl. ...................... 414/462; 224/921; 224/502; 224/537; 224/320; 224/321; 224/325
(58) Field of Search .................... 414/462; 224/921, 224/502, 525, 537, 319, 320, 321, 325

(56) References Cited

U.S. PATENT DOCUMENTS

| | | | |
|---|---|---|---|
| 2,492,841 | * 12/1949 | Burkey | 414/462 |
| 2,672,265 | 3/1954 | Milstead . | |
| 3,103,289 | * 9/1963 | Clary | 414/462 |
| 3,822,801 | * 7/1974 | Morgan, Jr. | 414/462 |
| 3,931,903 | * 1/1976 | Johnson | 414/462 |
| 4,695,218 | 9/1987 | Boyer . | |
| 4,815,638 | * 3/1989 | Hutyra | 224/525 |
| 4,856,686 | 8/1989 | Workentine . | |
| 4,934,894 | 6/1990 | White . | |
| 5,169,042 | 12/1992 | Ching . | |
| 5,190,195 | 3/1993 | Fulhart et al. . | |
| 5,205,446 | 4/1993 | Greenberg . | |
| 5,224,636 | * 7/1993 | Bounds | 224/921 |
| 5,232,133 | 8/1993 | Speer . | |
| 5,368,209 | 11/1994 | Hill . | |
| 5,456,564 | * 10/1995 | Bianchini | 414/462 |
| 5,462,398 | * 10/1995 | Hymer | 414/462 |
| 5,465,883 | 11/1995 | Woodward . | |
| 5,536,130 | * 7/1996 | Edensor | 414/462 |
| 5,615,814 | * 4/1997 | Dechant | 224/502 |
| 5,685,686 | * 11/1997 | Burns | 414/462 |

FOREIGN PATENT DOCUMENTS

75497A * 2/1953 (DK) ................................. 224/525

* cited by examiner

Primary Examiner—David A. Bucci
Assistant Examiner—Douglas Hess
(74) Attorney, Agent, or Firm—Harness, Dickey, & Pierce, P.L.C.

(57) ABSTRACT

A portable rack is shown for transporting objects including animal carcasses such as deer. The rack is removably secured to a vehicle and includes a carrying tray assembly adapted to receive the object, i.e. animal carcass. The rack is structured such that the tray assembly can be selectively mounted from a ground position to facilitate loading to an upright position for transporting of the object which has been loaded. The carrying tray assembly can also be selectively adjusted from a straight, in line contour to an arcuate or angulated contour.

17 Claims, 3 Drawing Sheets

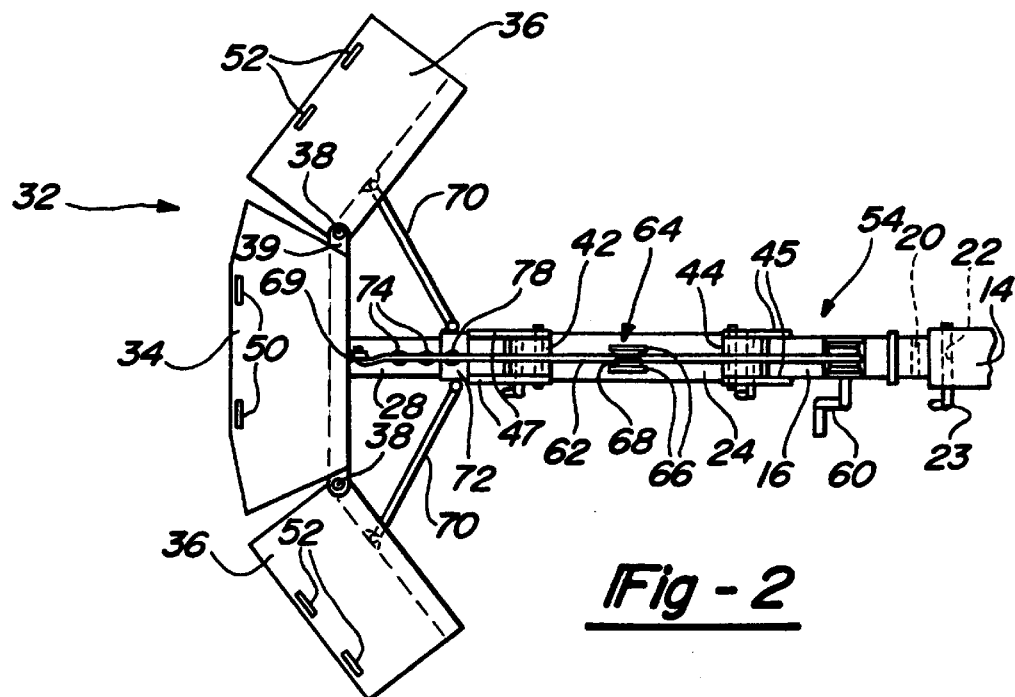
_Fig - 2_
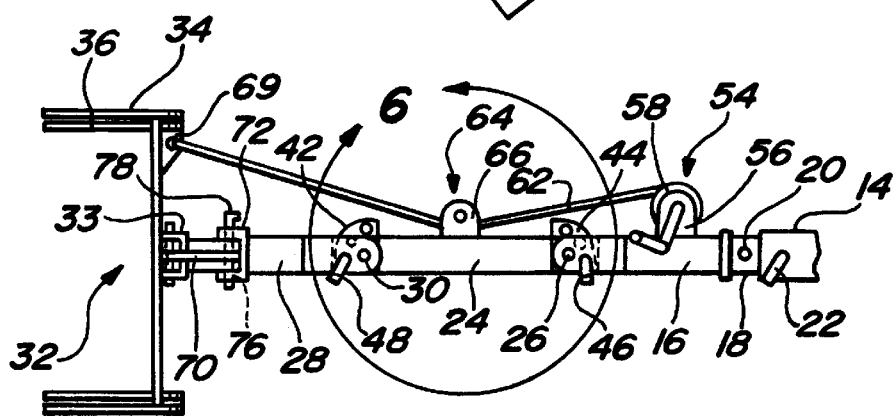
_Fig - 4_
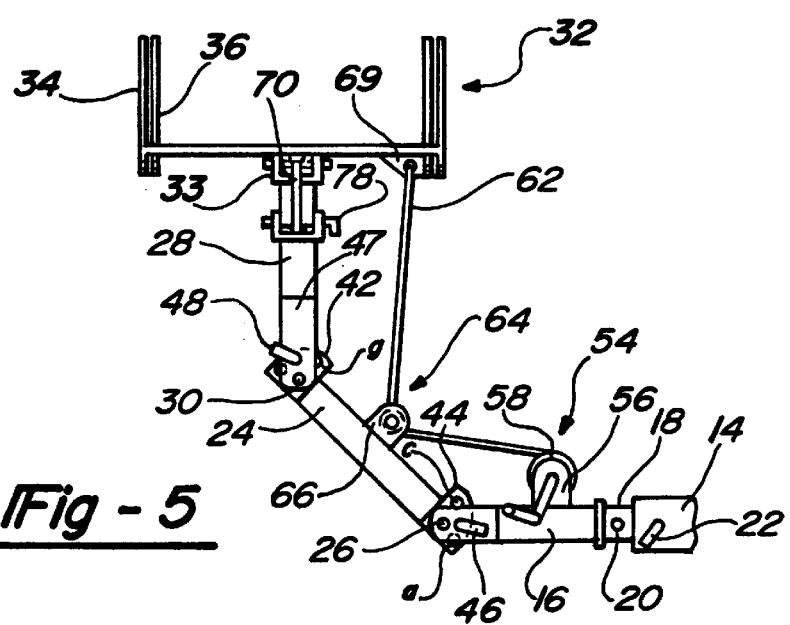
_Fig - 5_

PORTABLE RACK

SUMMARY BACKGROUND OF THE INVENTION

The present invention relates to a portable rack and more particularly to a portable rack for transporting items including animal carcasses such as deer.

Hunters for relatively large game such as deer are faced with the task of transporting the carcass either to their homes or some other location remote from the hunting site. This has been done by mounting the carcass onto the roof of a vehicle or possibly moving it into a van or the back of a pick-up truck. If mounted on the roof or some other exterior location the carcass must be fixed securely to the vehicle. If located internally the carcass could bring with it undesirable debris and/or odors. In either event the carcass is required to be lifted to the location of the vehicle where it is to be held during transport. The present invention provides a unique rack which can be mounted to a vehicle and which permits the carcass to be loaded at the ground level and then raised to a convenient position outside of the vehicle for storage during transport. In addition, the rack can be adjusted to best accommodate the shape of the carcass.

Therefore it is an object of the present invention to provide a unique, portable rack which can be removably mounted to a vehicle for hauling objects such as animal carcasses.

It is another object to provide a unique, portable rack which can be mounted to a vehicle and which can be readily manipulated to the ground level for loading of the object to be carried.

It is another object of the present invention to provide a unique portable rack for attachment to a vehicle and which has a carrying section which can be varied in contour to accommodate the shape of objects to be carried.

It is a general object of the present invention to provide a unique portable rack for attachment to a vehicle for carrying objects to be transported.

Other objects, features, and advantages of the present invention will become apparent from the subsequent description and the appended claims, taken in conjunction with the accompanying drawings.

BRIEF DESCRIPTION OF THE DRAWINGS

FIG. 2 is a top elevational view of the portable rack of FIG. 1;

FIG. 4 is a side elevational view of the portable rack of FIG. 3 taken generally in the direction of the Arrow 4 in FIG. 3;

FIG. 5 is a side elevational view of the portable rack of FIGS. 3 and 4 in its raised position for transport.

DETAILED DESCRIPTION OF THE PREFERRED EMBODIMENTS

Figure 1:
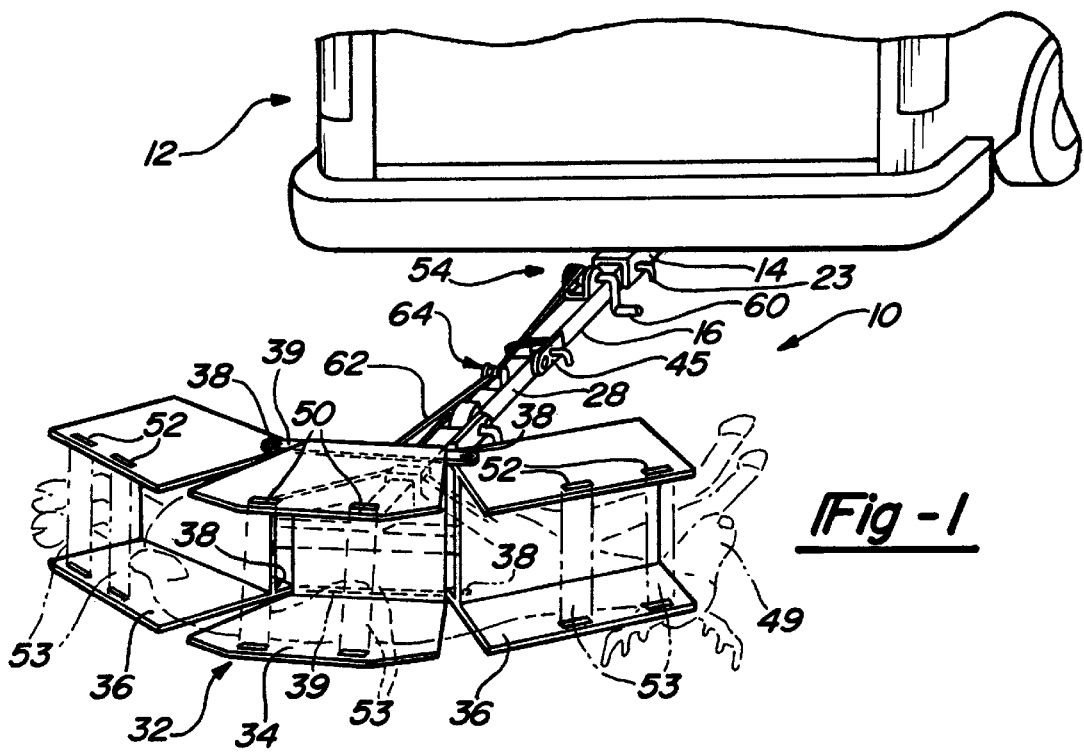
FIG. 1 is a pictorial view depicting the portable rack of the present invention mounted to the rear of a vehicle and located at a ground level position and having separate carrier trays which have been adjusted to a selected angular position with a deer carcass shown in phantom.

Looking now to the drawings, a portable rack 10 is shown secured to the rear of a vehicle 12. The vehicle 12 has a standard receiver tube 14 with a generally square opening. The receiver tube 14 is preferably of a standard construction conventionally used as a trailer hitch. The rack 10 has an insert or support tube 16 having an inner end 18 of a generally square cross section adapted to be slidingly received within the outer end of the receiver tube 14. The inner end 18 of the support tube 16 is provided with a plurality of spaced mounting holes 20 which can be selectively aligned with receiver holes 22 in the outer end of the receiver tube 14. A locking pin or rod 23 can be inserted through the aligned ones of mounting holes 20 and receiver holes 22 whereby the rack 10 will be secured to the receiver tube 14 and supported therein by the support tube 16.

As can be seen, the position of the rack 10 relative to the back side of the vehicle 12 can be adjusted simply by moving the support tube 16 more or less into the receiver tube 14 and fixing the location by selecting the set of mounting holes 20 to be in line with the receiver holes 22 and fixing that position with the locking pin 23.

An intermediate strut 24 is pivotally connected to the outer end of the support tube 16 via a pivot pin 26. An end strut 28 is in turn pivotally connected to the opposite end of the intermediate strut 24 via a pivot pin 30. A tray assembly 32 is fixed to the opposite end of the end strut 28 by a fastener and bracket assembly 33.

Figure 3:
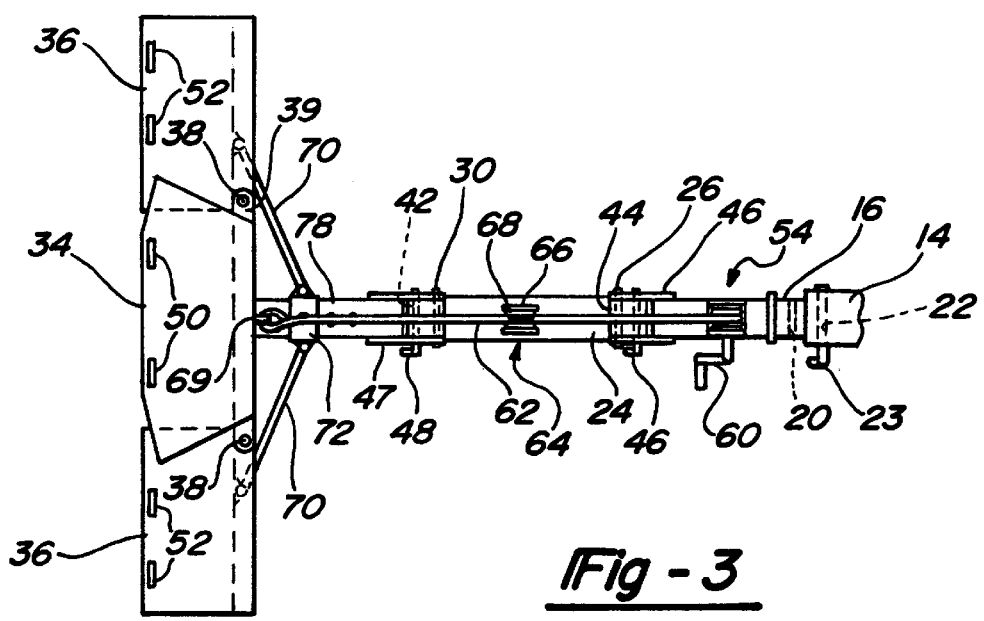
FIG. 3 is a top elevational view of the portable rack of FIG. 1 at the ground level position and with the trays adjusted to a straight line position.

The tray assembly 32 comprises a generally U-shaped, fixed center tray 34 and a pair of generally U-shaped end trays 36 pivotally secured at the opposite ends of the center tray 34 by pairs of pivot pins 38 at the ends of support bars 39. The opposite ends 40 of the center tray 34 are angulated outwardly to minimize the gap between the adjacent center tray 34 and the end trays 36 when in the angulated or arcuate position as shown in FIG. 2. At the same time, the end trays 36 are of a slightly smaller width than the center tray 34 so that they can be partially nested at the ends 40 of the center tray 34 when in the aligned or straight position as shown in FIG. 3.

Figure 6:
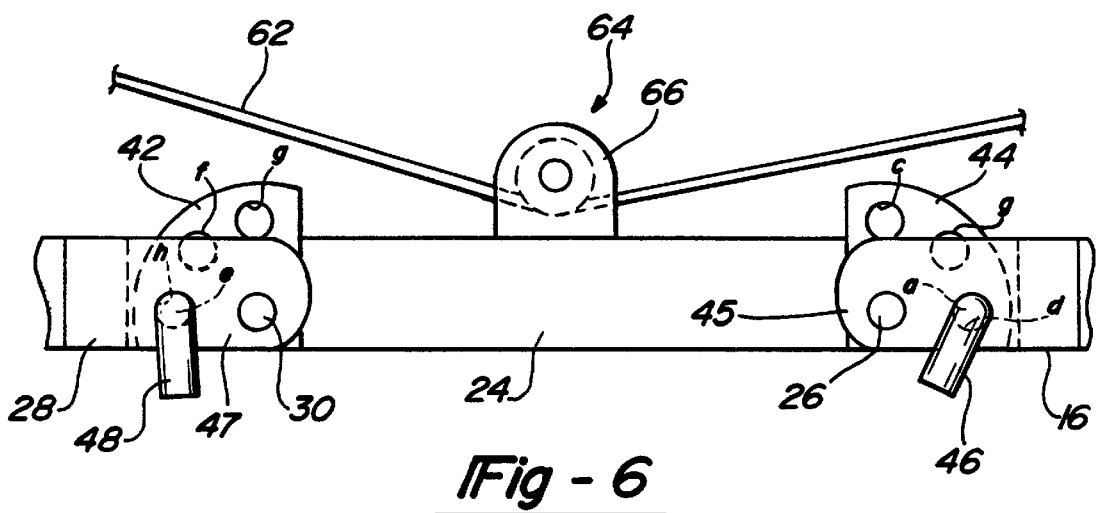
FIG. 6 is an enlarged fragmentary view taken in the area of the Circle 6 in FIG. 4 of the intermediate strut and associated angle blocks in pivotal assembly relationship with the support tube at one end and the end strut at the opposite end.

As noted one of the features of the unique rack is its adjustability whereby the tray assembly 32 can be set in various positions from a ground, loading position to various upright, carrying positions. Thus the intermediate strut 24 is provided with front and rear angle blocks 42 and 44, respectively, which are fixed to opposite ends of the strut 24 and which are selectively operable at different angular positions. Looking now to FIG. 6, it can be seen that the rear angle block 44 has three openings a, b and c which are at different angles relative to the pivot pin 26. The openings a, b and c are adapted to be selectively aligned with the axis of a fixed opening d in spaced plates 45 at the outer end of the support tube 16. The opening d is generally in axially longitudinal alignment with the pivot pin 26. The intermediate strut 24 can be pivoted about the pivot pin 26 to bring the selected one of the openings a, b and c in alignment with the opening d. The intermediate strut 24 can then be locked in the desired position by means of a locking pin or rod 46 placed in the opening d and the aligned one of the openings a, b and c. The openings a, b and c are spaced apart in 45° increments whereby openings a and c are spaced 45° on opposite sides of opening b and are, at the same time, 90° apart relative to each other.

The front angle block 42 is similarly constructed and has three openings e, f and g which are at different angles relative to the axis of the pivot pin 30. The openings e, f and g are adapted to be selectively aligned with a fixed opening h spaced plates 47 at in the lower end of the end strut 28. The opening h is generally in alignment with the axis of pivot pin 30 along the axis of the end strut 28. The end strut 28 can be pivoted about the pivot pin 30 to being the selected one of the opening e, f and g in alignment with the opening h. The end strut 28 can then be locked in the desired position relative to the intermediate strut 24 by means of a locking pin or rod 48 placed in the opening h and the aligned one of the openings e, f and g. The openings e, f and g are spaced apart by 45° increments whereby openings e and g are spaced 45° on opposite sides of opening f and are at the same time, 90° apart relative to each other. By selecting the openings a, b and c relative to the opening d at the rear angle block 44 and the openings e, f and g relative to the opening h at the front angle block 42 the angle of the tray assembly 32 can be set relative to the horizontal plane of the vehicle and the ground plane.

Thus when the rear angle block 44 is pivoted such that the opening a is located in alignment with opening d the intermediate strut 24 will be in line with the support tube 16 and hence with receiver tube 14 to be generally in a horizontal plane as shown in FIGS. 1–4. If at the same time, the front angle block 42 is pivoted such that the opening e is in alignment with the opening h then the end strut 28 will be in axial alignment with intermediate strut 24 to also be generally in a horizontal plane as shown in FIGS. 1–4. With this orientation the tray assembly 32 will be generally located generally horizontally and at ground level and in a position to readily receive an animal carcass or other item to be carried. Once the object is loaded into the tray assembly 32, the components can be re-oriented to place the end strut 28 and hence the tray assembly 32 in a vertical position as shown in FIG. 5. Thus for this orientation the opening b of the rear pivot block 44 will be in line with the opening d and the opening f in the front pivot block 42 will be in line with the opening h. This places the end strut 28 vertically and essentially at a right angle relative to the support tube 16. The carcass or other item, such as object 49 shown in phantom in FIG. 1, located in the tray assembly 32 can then be transported by the vehicle 12. Of course, strapping, belting or other means can be used to tie and further secure the carcass or object to the tray assembly 32. In this regard the center tray 34 and each of the end trays 36 are provided with slots 50 and 52, respectively, at their outer ends to receive straps, belts or the like to help secure the carcass or other object therein. Such straps, belts or the like are partially shown in phantom in FIG. 1 as elements 53.

It should be noted that the tray assembly 32 can be permitted to be pivoted to a position below the straight or horizontal position shown in FIG. 4 by simply removing one or both of the locking pins 46, 48. In this way the tray assembly 32 can be brought into support engagement with the ground for loading even when the terrain is somewhat uneven.

It can be seen that the orientation of FIG. 5 will locate the tray assembly a selected distance from the rearward end of the vehicle 12 and at a selected height. The tray assembly 32 can be located closer to the rearward end of the vehicle 12 and somewhat higher. This can be done by locating the opening c in the rear pivot block 44 to be in line with the opening d and the opening e in the front pivot block 42 to be in line with the opening h. It can be seen that the 45° spacing between openings a, b and c and between openings e, f and g readily facilitates such orientation while maintaining the end strut 28 at right angles to the support tube 16.

In both cases the right angled orientation of the end strut 28 relative to the support tube 16 will place the tray assembly 32, and hence the object being carried, in a generally vertical position.

In some cases it may be desirable that the tray assembly 32 be inclined towards the rear of the vehicle 12 for transport. In the arrangement of FIG. 5 this can be done by either locating the opening c of the rear pivot block 44 in line with the opening d in the support tube 16 or locating the opening e in front pivot block 42 in line with the opening h in the end strut 28. Likewise, with the intermediate strut 24 in its vertical position the tray assembly 32 can be tilted towards the rear of the vehicle 12 by locating the opening f in the front pivot block 42 to be in line with the opening h. Thus it can be seen that a variety of orientations can be selected to place the tray assembly 32 in a desired position for loading, transport or other uses.

In order to facilitate the manipulation of the intermediate strut 24 and end strut 28 with the tray assembly 32, a manually actuable pulley arrangement is utilized to provide a mechanical advantage to the operator.

Thus a pulley assembly 54 is secured to the support tube 16 and includes a pair of brackets 56 which are fixed to the upper side of the support tube 16 and rotatably support a drum 58 which can be selectively rotated by hand through a handle 60. A cable 62 is wound upon the drum 58 for actuation by the handle 60. The cable 62 is operatively connected to the intermediate strut 24 via a roller assembly 64. The roller assembly 64 includes a pair of support brackets 66 which are fixed to the upper side of the intermediate strut 24 and includes a roller 68. Thus the cable 62 extends beneath the roller 68 and can be readily moved generally without friction via the rolling action of the roller 68. The opposite end of the cable 62 is then fixed to a bracket 69 located at the bottom rearward end of the center tray 34. Thus the desired orientation of the tray assembly 32 can be selected by the operator through actuation of the cable 62 simply by rotation of the handle 60 of the pulley assembly 54. Such actuation will pivot the intermediate strut 24 and the end strut 28 relative to each other and relative to the support tube 16 such that the desired position of the tray assembly 32 can be selected and fixed.

As noted, it may be desirable to move the end trays 36 relative to the center tray 34 to accommodate the shape of carcasses or other objects of various shapes. To this end, as previously noted, the end trays 36 are pivotally connected to the center tray 34 at opposite ends by way of the pivot pins 38 and associated support bars 39. A pair of angle rods 70 are pivotally secured at one end to an intermediate location of the associated one of the end trays 36. The opposite ends of the angle rods 70 are in turn pivotally secured to a support sleeve 72. The support sleeve 72 is slidingly located over the outer end of the end strut 28. The end strut 28 is provided with a plurality of bores 74 at its outer end. At the same time the support sleeve 72 is provided with a locating bore 76. Thus by sliding the support sleeve 72 along the outer end of the end strut 28, a selected one of the sleeve bores 74 can be brought into alignment with the locating bore 76. This position can be fixed by a pin or rod 78 through the aligned bores. Alignment of the locating bore 76 with the outermost one of the sleeve bores 74 will place the end trays 36 in their position in line with the center tray 34. This position is shown in FIG. 3. By moving the support sleeve 72 to place the locating bore 76 in line with innermost one of the bores 74 the end trays 36 will be pivotally angled away from the center tray 34 to a somewhat arcuate arrangement as shown in FIGS. 1 and 2. The degree of angulation can be changed simply by utilizing one of the other sleeve bores 74.

Thus it can be seen that the unique rack of the present invention provides a versatile structure in which the loading of an object into the carrying tray assembly 32 can be facilitated by pivoting the intermediate strut 24 and end strut 28 to a loading position through simple manipulation of the pulley assembly 54. The same is true for adjustment of the carrying tray assembly 32 to a transport. In addition the configuration or contour of the carrying tray assembly 32 can be readily adjusted via pivotal adjustment of the end trays 36 to accommodate the shape and size of the object to be carried. It should be understood that by simply following the teachings set forth herein additional angular adjustment could be readily provided; for example, the end trays 36 could be make separately angularly adjustable. Thus with such a structure one of the end trays 36 could be positioned to be in line with the center tray 34 while the other one of the end trays 36 could be set at a selected angle relative to the center tray 34.

While it will be apparent that the preferred embodiments of the invention disclosed are well calculated to fulfill the objects stated above, it will be appreciated that the invention is susceptible to modification, variation and change without departing from the proper scope or fair meaning of the invention.

What is claimed is:

1. A portable rack operable with a vehicle for transporting objects including animal carcasses such as deer, the rack comprising:

mounting means for removably mounting said race onto the vehicle, carrying tray means for receiving and holding the object to be transported, position adjustment means selectively operable for locating said carrying tray means to a low or ground position for loading and unloading of the object onto and from said carrying tray means and for locating said carrying tray means to a selectable plurality of upper or raised position for transport by the vehicle said carrying tray means having a definable configuration adapted to receive and hold the object to be transported and said rack further comprising configuration adjustment means selectively operable for varying the configuration of said carrying tray means for receiving and holding objects of different sizes and shapes.

2. The portable rack of claim 1 with said position adjustment means selectively operable for locating said carrying tray means to a selectable plurality of low or ground positions for loading and unloading the object onto and from said carrying tray means.

3. The portable rack of claim 1 further comprising attachment means selectively operable for locating said portable rack at selected locations towards or away from the vehicle.

4. A portable rack operable with a vehicle for transporting objects including animal carcasses such as deer, the rack comprising:

mounting means for removably mounting said rack onto the vehicle, carrying tray means for receiving and holding the object to be transported, position adjustment means selectively operable for locating said carrying tray means to a low or ground position for loading and unloading of the object onto said carrying tray means and for locating said carrying tray means to an upper or raised position for transport by the vehicle, said carrying tray means comprising a plurality of trays having a configuration adapted to receive and hold the object to be transported and being connected to each other, and configuration adjustment means selectively operable with said trays for locating said trays at different fixed angular positions relative to each other for varying the configuration of said carrying tray means for receiving and holding objects of different sizes and shapes.

5. The portable rack of claim 4 with said carrying tray means comprising a fixed center tray and a pair of end trays pivotally connected to opposite ends of said center tray, said configuration adjustment means operable for pivotally locating said end trays at different fixed angular positions relative to said center tray whereby the configuration of said carrying tray means can be selectively varied.

6. A portable rack operable with a vehicle for transporting objects including animal carcasses such as deer, the rack comprising:

mounting means for removably mounting said rack onto the vehicle, carrying tray means for receiving and holding the object to be transported, position adjustment means selectively operable for locating said carrying tray means to a low or ground position for loading and unloading of the object onto said carrying tray means and for locating said carrying tray means to a transport position for transport by the vehicle, said adjustment means selectively operable for locating and setting said carrying tray means to a plurality of positions from the low or ground position for loading and unloading and to a plurality of fixed transport positions for transport by the vehicle, said carrying tray means having a definable configuration adapted to receive and hold the object to be transported and said rack further comprising configuration adjustment means selectively operable for varying the configuration of said carrying tray means for receiving and holding objects of different sizes and shapes.

7. The portable rack of claim 6 comprising a support member adapted to be secured to the vehicle, an intermediate strut pivotally connected at one end to said support member, and an end strut pivotally connected at one end to the opposite end of said intermediate strut, said carrying tray means connected to the opposite end of said end strut, said adjustment means operable for pivotally locating and fixing said intermediate strut to selected angular positions relative to said support member and for pivotally locating and fixing said end strut to selected angular positions relative to said intermediate strut whereby said carrying tray means can be located and set at a plurality of positions from the low or ground position to the transport positions.

8. The portable rack of claim 7 with said adjustment means including a pulley and cable assembly connected between said support member and said end strut and operable for applying a force to said end strut for raising and lowering said carrying tray means to said plurality of positions.

9. The portable rack of claim 7 with the vehicle having a standard receiver tube for a trailer hitch and said support member being adapted to be selectively connected to said receiver tube to locate said portable rack at locations towards or away from the vehicle.

10. A portable rack operable with a vehicle for transporting objects including animal carcasses such as deer, with the vehicle having a receiver member located at an accessible position at the rear of the vehicle, the rack comprising:

mounting means for removably mounting said rack onto the vehicle, said mounting means comprising a support member adapted to be connected to the receiver member, carrying tray means for receiving and holding the object to be transported, position adjustment means selectively operable for locating said carrying tray means to a low or ground position for loading and unloading of the object onto said carrying tray means and for locating said carrying tray means to an upper or raised position for transport by the vehicle, said position adjustment means selectively operable for locating said carrying tray means to a plurality of low or ground positions for loading the objects onto said carrying tray means, said position adjustment means selectively operable for locating said carrying tray means to a plurality of upper or raised positions for transport, said carrying tray means comprising a plurality of trays pivotally connected to each other in a predetermined configuration adapted to receive and hold the object to be transported, and configuration adjustment means selectively operable with said trays for locating said trays at different, fixed angular positions relative to each other for varying the configuration of said carrying tray means for receiving and holding objects of different sizes and shapes.

11. The portable rack of claim 10 comprising an intermediate strut pivotally connected at one end to said support member, and an end strut pivotally connected at one end to the opposite end of said intermediate strut, said carrying tray means connected to the opposite end of said end strut, said position adjustment means operable for pivotally locating and fixing said intermediate strut to selected angular positions relative to said support member and for pivotally locating and fixing said end strut to selected angular positions relative to said intermediate strut whereby said carrying tray means can be located and fixed at a plurality of positions from the ground position to the transport position, said carrying tray means comprising a fixed center tray and a pair of end trays pivotally connected to opposite ends of said center tray, said configuration adjustment means operable for pivotally locating said end trays at different fixed angular positions relative to said center tray whereby the configuration of said carrying tray means can be varied, said position adjustment means including a pulley and cable assembly connected between said support member and said end strut and operable for applying a force to said end strut for raising and lowering said carrying tray means to said plurality of positions, and attachment means including said support member being selectively operable for fixing said support member at a plurality of fixed positions on the receiver member whereby said portable rack can be fixed at a plurality locations towards or away from the vehicle.

12. The portable rack of claim 11 with said position adjustment means including a front angle structure operatively associated with said end strut and said intermediate strut and comprising a plurality of front openings spaced at selected angles from each other and adapted to be selectively located in line with a fixed front opening whereby the angular position between said end strut and said intermediate strut can be set and a rear angle structure operatively associated with said support member and said intermediate strut and said position adjustment means further comprising a plurality of rear openings spaced at selected angles from each other and adapted to be selectively located in line with a fixed rear opening whereby the angular position between said support member and said intermediate strut can be set.

13. The portable rack of claim 11 with said configuration adjustment means comprising a sleeve member slidably supported on said end strut to a plurality of selectable fixed positions and further comprising angle rods pivotally connected to said sleeve member and to each of said end trays whereby movement of said sleeve member along said end strut to different ones of said fixed positions will vary the angular relationship of said end trays with said center tray whereby the configuration of said carrying tray means can be selectably varied.

14. The portable rack of claim 10 comprising an intermediate strut pivotally connected at one end to said support member, and an end strut pivotally connected at one end to the opposite end of said intermediate strut, said carrying tray means connected to the opposite end of said end strut, said position adjustment means operable for pivotally locating and fixing said intermediate strut to selected angular positions relative to said support member and for pivotally locating and fixing said end strut to selected angular positions relative to said intermediate strut whereby said carrying tray means can be located and fixed at a plurality of positions from the ground position to the transport position, said carrying tray means comprising a fixed center tray and a pair of end trays pivotally connected to opposite ends of said center tray, said configuration adjustment means operable for pivotally locating said end trays at different fixed angular positions relative to said center tray whereby the configuration of said carrying tray means can be varied.

15. The portable rack of claim 14 with said position adjustment means including a pulley and cable assembly connected between said support member and said end strut and operable for applying a force to said end strut for raising and lowering said carrying tray means to said plurality of positions.

16. The portable rack of claim 14 further comprising attachment means including said support member being selectively operable for fixing said support member at a plurality of fixed positions on the receiver member whereby said portable rack can be fixed at a plurality locations towards or away from the vehicle.

17. The portable rack of claim 10 comprising an intermediate strut pivotally connected at one end to said support member, and an end strut pivotally connected at one end to the opposite end of said intermediate strut, said carrying tray means connected to the opposite end of said end strut, said position adjustment means operable for pivotally locating and fixing said intermediate strut to selected angular positions relative to said support member and for pivotally locating and fixing said end strut to selected angular positions relative to said intermediate strut whereby said carrying tray means can be located and fixed at a plurality of positions from the ground position to the transport position, said carrying tray means comprising a fixed center tray and a pair of end trays pivotally connected to opposite ends of said center tray, said configuration adjustment means operable for pivotally locating said end trays at different fixed angular positions relative to said center tray whereby the configuration of said carrying tray means can be varied, said position adjustment means including a pulley and cable assembly connected between said support member and said end strut and operable for applying a force to said end strut for raising and lowering said carrying tray means to said plurality of positions, and attachment means including said support member being selectively operable for fixing said support member at a plurality of fixed positions on the receiver member whereby said portable rack can be fixed at a plurality of locations towards or away from the vehicle, said position adjustment means including a front angle structure operatively associated with said end strut and said intermediate strut and comprising a plurality of front openings spaced at selected angles from each other and adapted to be selectively located in line with a fixed front opening whereby the angular position between said end strut and said intermediate strut can be set and said position adjustment means further including a rear angle structure operatively associated with said support member and said intermediate strut and further comprising a plurality of rear openings spaced at selected angles from each other and adapted to be selectively located in line with a fixed rear opening whereby the angular position between said support member and said intermediate strut can be set, the portable rack with said configuration adjustment means comprising a sleeve member slidably supported on said end strut to a plurality of selectable fixed positions and said configuration adjustment means further comprising angle rods pivotally connected to said sleeve member and to each of said end trays whereby movement of said sleeve member along said end strut to different ones of said fixed positions will vary the angular relationship of said end trays with said center tray whereby the configuration of said carrying tray means can be selectably varied.

* * * * *

UNITED STATES PATENT AND TRADEMARK OFFICE
CERTIFICATE OF CORRECTION

PATENT NO.     : 6,186,729 B1
DATED          : February 13, 2001
INVENTOR(S)    : David R. Sargent It is certified that error appears in the above-identified patent and that said Letters Patent is hereby corrected as shown below:

<u>Column 5,</u>
Line 7, after "transport" insert -- position --
Line 28, claim 1, delete "race" and substitute therefor -- rack --.

Signed and Sealed this

Second Day of October, 2001

Attest:

NICHOLAS P. GODICI
Attesting Officer — Acting Director of the United States Patent and Trademark Office